Oct. 5, 1954 R. F. CASEY 2,691,101
SWEEP CIRCUIT
Filed April 4, 1952
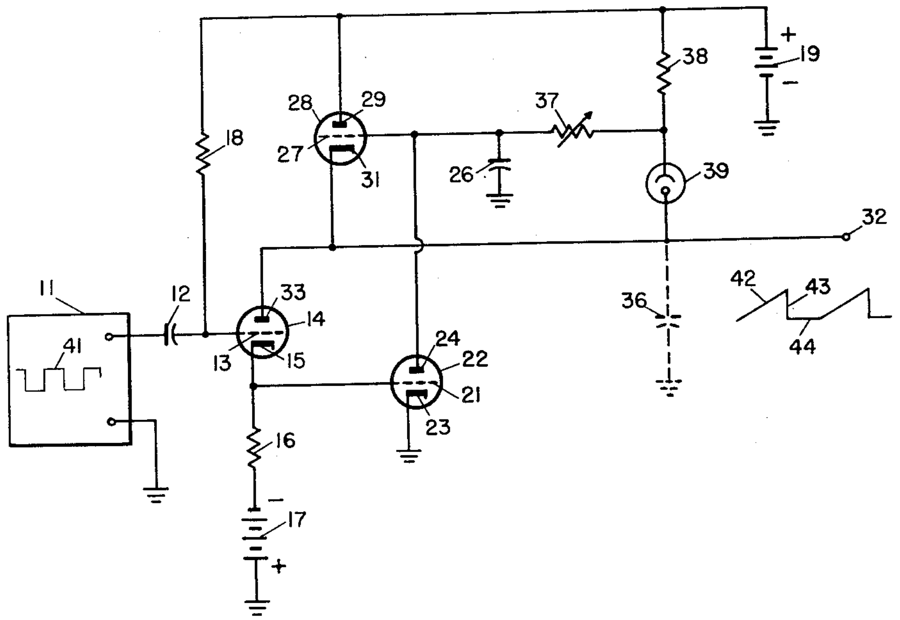
INVENTOR.
ROBERT F. CASEY
BY Darby & Darby
ATTORNEYS Patented Oct. 5, 1954 2,691,101

UNITED STATES PATENT OFFICE 2,691,101

SWEEP CIRCUIT

Robert F. Casey, Pompton Plains, N. J., assignor to Allen B. Du Mont Laboratories, Inc., Clifton, N. J., a corporation of Delaware Application April 4, 1952, Serial No. 280,685

3 Claims. (Cl. 250—27)

This invention relates to electrical circuits and particularly to circuits for producing sawtooth voltage waves. Such waves are useful, for example, in causing an electron beam to scan a phosphor screen in a cathode-ray tube.

In certain high-speed sweep circuits, it is found desirable to provide a large value of output impedance in order that the sawtooth sweep voltage will be more linear than it would be with a relatively small output impedance. On the other hand, it is found desirable to provide a relatively small value of output impedance in order to avoid undesirable effects caused by stray capacitance. Accordingly, in the past it has been necessary to compromise the magnitude of the output impedance of such sweep circuits, thereby not realizing the full benefits that could be obtained if it were of the correct value to achieve each of the recited desiderata.

Objects of the invention are to provide a sweep circuit for producing a saw-tooth voltage having improved linearity and a fast-acting return sweep, and to provide a high output impedance during each sawtooth sweep signal and a low output impedance during each return sweep.

Other objects will in part be obvious and in part appear hereinafter.

Invention thus is embodied in a sweep circuit which includes a condenser for producing an appropriate sweep signal and a coupling circuit connecting the condenser to a triggering circuit and to a load, the coupling circuit including means to vary the load impedance so that it is relatively large during certain selected portions of the sweep signal and relatively small in value during other portions of the sweep signal. The invention, accordingly, is embodied in the circuit having the elements and combination of parts to develop the properties hereinafter described in greater detail.

The single figure of the drawing shows a preferred circuit utilizing the invention.

A source 11 of keying signals is connected through a condenser 12 to a control electrode 13 of a control tube 14 having a cathode 15 connected through a resistance 16 to a source 17 of negative voltage. The control electrode 13 is connected through a resistance 18 to a source 19 of voltage having positive polarity. The cathode 15 is connected to a control electrode 21 of a discharge tube 22 having a cathode 23, which is grounded, and an anode 24 which is connected to a saw-forming condenser 26 and to a control electrode 27 of an output tube 28 having an anode 29 connected to the voltage source 19 and a cathode 31 connected to an output terminal 32 and to anode 33 of the control tube 14. Stray circuit capacitance between the output terminal 32 and ground is represented by the capacitance 36 shown in dotted lines. The saw-forming condenser 26 is connected to the voltage source 19 through a variable resistance 37 and a fixed resistance 38. A constant-voltage device 39 is connected between the output terminal 32 and the junction between the variable resistance 37 and fixed resistance 38.

The circuit operates as follows: The signal source 11 preferably provides a rectangularly shaped keying pulse signal 41 which may have an essentially square wave shape as shown in the figure, or may be in the form of narrow trigger pulses. The signal 41 is applied to the control electrode of the control tube 14. This control tube, being positively biased by the resistance 18 connected to the positive voltage source 19, is normally conductive. The discharge tube 22 also is normally conductive since its control electrode 21 is connected to the cathode 15 of the control tube 14. The discharge tube 22, therefore, normally maintains the saw-forming capacitance 26 in a discharged condition.

The current for the control tube 14, when in its conductive state, is supplied from the voltage source 19 through the output tube 28, as well as through the constant-voltage device 39. It will be noted that the control tube 14 forms a part of the output impedance of the circuit, since it is connected between the output terminal 32 and ground, along with the series-connected resistance 16 and voltage source 17. When the control tube 14 is in its conductive state, the output impedance of the circuit is essentially that of the resistance 16 and voltage source 17, in parallel with the grid-to-cathode impedance of the discharge tube 22. This impedance has a relatively low value, since there is an electron flow between the cathode 23 and grid 21 when the voltage at this grid is of positive polarity. When the input signal 41 becomes sufficiently negative in polarity, the control tube 14 becomes relatively less conductive and the discharge tube 22 ceases to be conductive, since its control electrode 21 is cathode-coupled through the control tube 14 to the signal source 11. When the control electrode 21 is thus made negative, it ceases to draw current, and the shunting impedance across the resistance 16 due to this current, is removed.

While the discharge tube 22 is non-conductive, the saw-forming condenser 26 begins to charge from the source 19 through the resistance 37 and 38. While the charging voltage is increasing on the condenser 26, it is cathode-coupled through the output tube 28 to the output terminal 32; thus a positive sawtooth voltage signal 42 is provided at the output terminal 32. While the sawtooth voltage signal 42 is being produced at the output terminal 32, the output impedance of the circuit is relatively high, since the control tube 14 is relatively non-conducting during this period.

The stray capacitance 36 is charged in accordance with the output voltage 42. The constant-voltage device 39 functions to improve the linearity of the sawtooth voltage signal, as is more fully described in my co-pending patent application, Serial No. 284,611.

When the input signal 41 changes so that the control electrode 13 of the control tube 14 is no longer sufficiently negative to render this tube only slightly conductive, the tube returns to its normal highly-conductive state and thereby causes the discharge tube 22 to return to its normal conductive state, thereby quickly discharging the capacitance 26, and causing the output voltage to return quickly to its quiescent value. This return, designated 43 on the output waveform, is the return trace of the output signal whereas the sloped portion 42 represents the active sweep portion of the output signal. At the time of occurrence of the return sweep 43, the output impedance of the circuit is rendered relatively low in value, since the control tube 14 at that point is highly conductive. This low impedance is useful because it serves to discharge quickly the stray capacitance 36 which otherwise would discharge relatively slowly and would thus delay the speed of the return trace 43.

The invention improves the linearity of the sawtooth output signal by providing a high output impedance during the time of the active portion 42 of the output signal. It is well known that a cathode follower circuit such as the circuit associated with the output tube 28 functions the most linearly when its output impedance is made large. This desideratum is accomplished by the functioning of the control tube 14. It is further desired to provide a low output impedance during the return portion of the trace in order that the stray capacitance 36 will be quickly discharged. This is accomplished by the control tube 14. The novel circuit also provides economy of power from the voltage source 19, by requiring only a low current drain during the time of active sweep 42, because of the high output impedance of the circuit during this time.

If the keying input signal 41 is of a shape having relatively narrow positive portions, a repetitive sawtooth output wave will be formed instead of that illustrated, which has a relatively great non-sweep portion 44 between each active sweep portion 42. The time duration of the non-sweep portion 44 corresponds to the time duration of the positive polarity portions of the keying signal 41. Thus, the configuration of the output signal may be controlled and the active sweep portions may be spaced as desired. The speed and shape of the positive sweep portions 42 may be varied by adjusting the variable resistance 37, by adjusting the size of the condenser 26, and by changing the characteristics of the constant voltage device 39. The resistance 16 functions as a cathode load resistance for the control tube 14. The voltage source 17 functions to provide correct operating voltages on the tubes in the circuit. A pentode-type tube may be employed as the control tube 14, if desired, to further improve the linearity of the output signal, due to the constant-current characteristic of such a tube.

While a preferred embodiment of the invention has been disclosed and described, modifications thereof will be apparent to those skilled in the art. The true scope of the invention is defined in the appended claims.

What is claimed is:

1. A sweep circuit comprising a condenser, a source of voltage, an impedance connected therebetween, a first electronic tube having output electrodes connected in parallel with said condenser and having a control-electrode, a second electronic tube having a control electrode connected to said condenser and having a cathode, a third electronic tube having an anode connected to said cathode and a cathode connected to said control electrode of said first electronic tube and a control electrode, and a source of keying signals connected to said control electrode of said third electronic tube.

2. The circuit in accordance with claim 1, including a capacitance connected in shunt with said third tube.

3. The circuit in accordance with claim 1, including an output terminal connected to said anode of said third tube.

References Cited in the file of this patent

UNITED STATES PATENTS

| Number | Name | Date |
|---|---|---|
| 2,428,926 | Bliss | Oct. 14, 1947 |
| 2,489,312 | Pacini | Nov. 29, 1949 |
| 2,542,631 | Crain | Feb. 20, 1951 |
| 2,554,172 | Custin | May 22, 1951 |
| 2,576,339 | Gray | Nov. 27, 1951 |